US010136316B2

(12) United States Patent  (10) Patent No.: US 10,136,316 B2
Arning et al.  (45) Date of Patent: Nov. 20, 2018

(54) UNLOCKING OF A MOBILE DEVICE BY A CODE RECEIVED VIA A STENCIL ON A TOUCHSCREEN

(71) Applicant: International Business Machines Corporation, Armonk, NY (US)

(72) Inventors: Andreas Arning, Tuebingen (DE); Jens Engelke, Holzgerlingen (DE); Klaus Rindtorff, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 15/278,177

(22) Filed: Sep. 28, 2016

(65) Prior Publication Data

US 2018/0091973 A1  Mar. 29, 2018

(51) Int. Cl.
*H04M 1/66* (2006.01)
*H04W 12/06* (2009.01)
(Continued)

(52) U.S. Cl.
CPC ............ *H04W 12/06* (2013.01); *G06F 21/34* (2013.01); *G06F 21/36* (2013.01)

(58) Field of Classification Search
CPC ...... G06F 3/041; G06F 21/36; G06F 3/03547; G06F 21/32; G06F 21/34; G06F 3/04883;
(Continued)

(56) References Cited

U.S. PATENT DOCUMENTS 7,593,000 B1 * 9/2009 Chin ................... G06F 3/04883
345/156
7,910,910 B2 * 3/2011 Sun ..................... G11C 13/0004
216/18

(Continued)

FOREIGN PATENT DOCUMENTS

CN  201413505 Y  *  2/2010
EP  2741198 A2  *  6/2014  ............. G06F 3/048
(Continued)

OTHER PUBLICATIONS

Shahzad et al., Secure Unlocking of Mobile Touch Screen Devices by Simple Gestures—You can see it but you can not do it, Source: Proceedings of the 19th annual international conference on Mobile computing & networking, pp. 39-50, 2013 Article, pp. 39-50.

(Continued)

*Primary Examiner* — Mahendra Patel
(74) *Attorney, Agent, or Firm* — Schmeiser, Olsen & Watts, LLP; Scott Dobson

(57) ABSTRACT

A method and system for authenticating an access to a service on a device. After a stencil has been positioned on a touch-sensitive screen of the device:
an entry of a code to the touch-sensitive screen is received through at least one opening in the stencil at one or more predefined locations in the stencil, wherein the one or more predefined locations define at least part of an access code; and it is determined that the entered code equals the at least part of the access code, and in response, the access to the service on the device is granted.

16 Claims, 5 Drawing Sheets

(51) Int. Cl.
*G06F 21/36* (2013.01)
*G06F 21/34* (2013.01)

(58) Field of Classification Search
CPC ... G06F 3/044; H04M 1/72577; H04W 12/08; H04W 12/06; H04W 88/02; H04W 21/32; H04L 9/32; H04L 63/0861; H04L 63/08; H04L 63/104
USPC ......... 455/411, 566; 713/183, 186; 345/156, 345/173, 419
See application file for complete search history.

(56) References Cited

U.S. PATENT DOCUMENTS

| | | | | |
|---|---|---|---|---|
| 8,504,842 | B1* | 8/2013 | Meacham | G06F 3/0488 713/182 |
| 2004/0183787 | A1* | 9/2004 | Geaghan | G06F 3/044 345/173 |
| 2009/0083850 | A1* | 3/2009 | Fadell | G06F 21/316 726/19 |
| 2009/0284482 | A1* | 11/2009 | Chin | G06F 3/04883 345/173 |
| 2010/0225443 | A1* | 9/2010 | Bayram | G06F 21/316 340/5.83 |
| 2012/0188176 | A1* | 7/2012 | Uzelac | G06F 3/0418 345/173 |
| 2013/0063167 | A1* | 3/2013 | Jonsson | G06F 3/0418 324/686 |
| 2013/0147795 | A1* | 6/2013 | Kim | G06F 21/36 345/419 |
| 2013/0159939 | A1* | 6/2013 | Krishnamurthi | G06F 3/011 715/863 |
| 2013/0173925 | A1* | 7/2013 | Yen | G06F 21/32 713/186 |
| 2013/0333020 | A1* | 12/2013 | Deshpande | G06F 21/36 726/16 |
| 2014/0137234 | A1* | 5/2014 | Chin | G06F 21/36 726/19 |
| 2014/0306903 | A1* | 10/2014 | Huang | G06F 11/3485 345/173 |
| 2015/0229757 | A1 | 8/2015 | Chai et al. | |
| 2015/0242613 | A1* | 8/2015 | Kuscher | G06F 3/16 726/19 |

FOREIGN PATENT DOCUMENTS

| | | | | |
|---|---|---|---|---|
| KR | 20150116155 A | * | 10/2015 | |
| WO | WO 2015101392 A1 | * | 7/2015 | ............. B41F 15/36 |

OTHER PUBLICATIONS

Oakley et al., Multi-Touch Passwords for Mobile Device Access, Source: Proceedings of the 2012 ACM Conference on Ubiquitous Computing, pp. 611-612, 2012 Article, pp. 611-612.

Zheng et al., You Are How You Touch: User Verification on Smartphones via Tappling Behaviors, Source: Network Protocols (ICNP), 2014 IEEE 22nd International Conference, pp. 221-232, Date of conference: Oct. 21-24, 2014, pp. 1-12.

* cited by examiner

US 10,136,316 B2

UNLOCKING OF A MOBILE DEVICE BY A CODE RECEIVED VIA A STENCIL ON A TOUCHSCREEN

TECHNICAL FIELD

The invention relates generally to a method and system for authenticating an access to a service, and more specifically, to using a stencil for granting access to a service on a device.

BACKGROUND

Recent development of communication technologies has resulted in mobile devices being used for different functions. Different user interfaces have been provided, wherein a most predominant .se interface is based on touch-sensitive screens or touch screens. Many different technologies have been used to unlock a mobile device for usage; i.e., granting access to the mobile device's functions. Typically, mobile devices that are smart devices are put into a sleep mode if not used in order to prevent unintentional reception of signals from the touch screen if the device is, e.g., in a pocket of the user. In order to set the mobile device again into an active mode, often a PIN (personal identification number) has to be typed in if a slider is to be moved or activated.

However, in cases in which the mobile device (e.g., a smart phone with a (subscriber identification module) SIM card) may be used the first time, increased security standards have to be met. Hence, there is a need to increase the barrier for an unauthorized access to a mobile device or to other devices being equipped with a touch-sensitive screen.

SUMMARY

Embodiments of the present invention provide a method, and an associated computer system and computer program product, for authenticating an access to a service on a device. After a stencil has been positioned on a touch-sensitive screen of the device: one or more processors receive one or more touches indicating an entry of a code to the touch-sensitive screen through at least one opening in the stencil at one or more predefined locations in the stencil, wherein the one or more predefined locations define at least part of an access code; and the one or more processors determined that the entered code equals the at least part of the access code, and in response, the one or more processors grant the access to the service on the device.

BRIEF DESCRIPTION OF THE DRAWINGS

Embodiments of the present invention will be described, by way of example only, and with reference to the following drawings.

DETAILED DESCRIPTION

Figure 1:
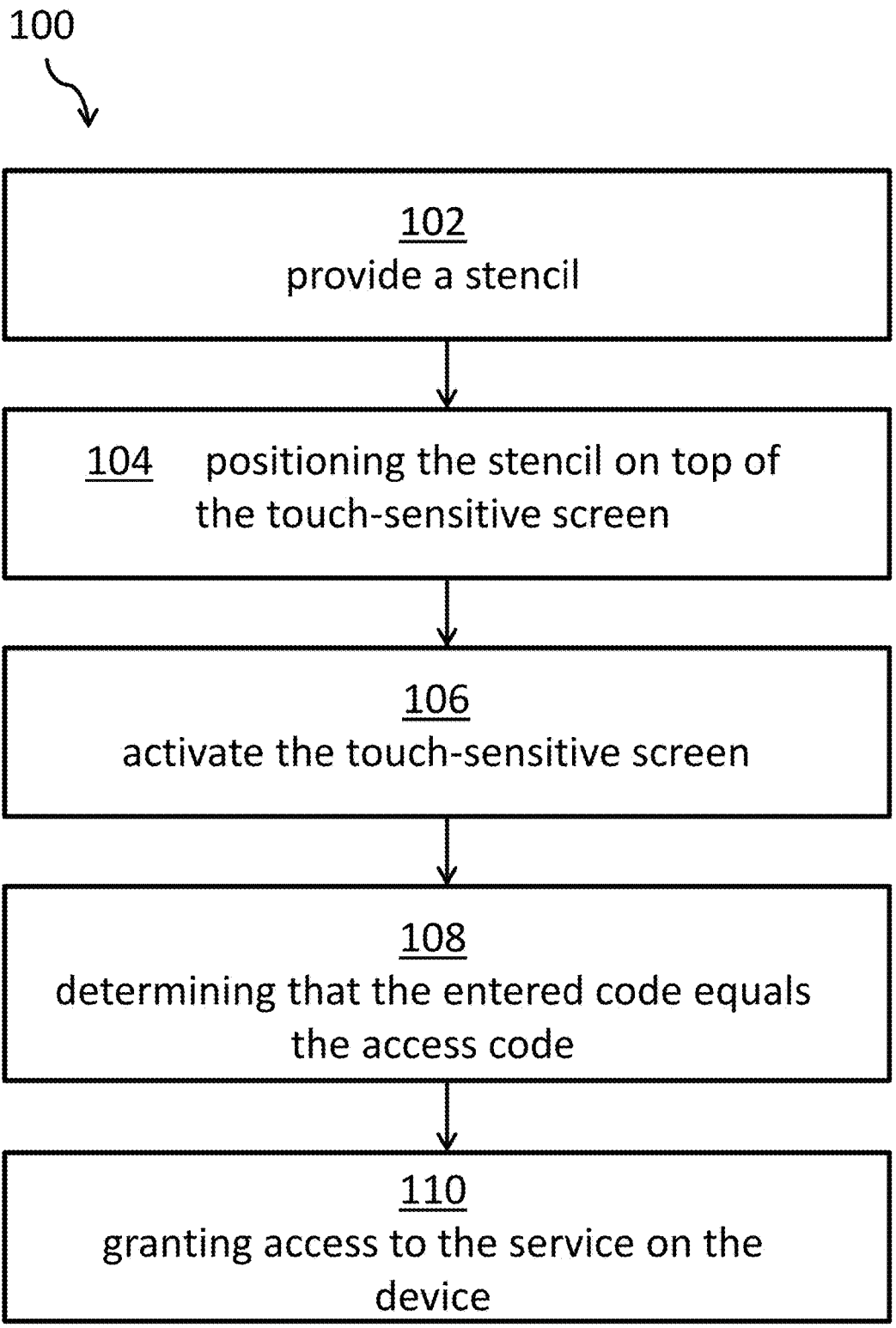
FIG. 1 shows a block diagram of an embodiment of a method for authenticating an access to a service on a device, in accordance with embodiments of the present invention.

It may be noted that the service the present invention's authenticating method allows an access to may be an access to the device; i.e., all functions of the device itself.

In the context of this description, the following conventions, terms and/or expressions may be used.

The term 'authenticating an access to a device' may denote unlocking a device, so that an operator or user may use the device.

The term 'touch-sensitive screen', or 'touch screen', may denote an input device layered on the top of an electronic visual display of an information processing device. A user may give input or control the device through simple or multi-touch gestures by touching the screen with a special stylus and/or one or more fingers. Some touch-screens may require ordinary or specially coated gloves to work while other touch-screens may require use of a special stylus/pen only. The user can use the touch-screen to react to what image or text is displayed and to control how the image or text that is displayed; for example, zooming to increase the text size of the text. The touch-screen enables the user to interact directly with the image or text that is displayed, rather than using a pointing device such as a mouse, touch-pad, or any other intermediate device (other than a stylus, which is optional for most modem touch-screens).

The term 'stencil' may denote a mask in form of a substantially flat material; i.e. a flat stencil (e.g., a flat plastic sheet with a certain stability and bendability, an already known plastic card such as an ID, a driver's license, a credit card, etc.). However, various materials may be used for the flat stencil such as a foil, paper, cardboard, fabric, wood, and so on, and combinations thereof. In one embodiment, and especially in case of a capacitive touch-sensitive screen, the flat stencil may be made of electrically non-conductive material.

The term 'opening' may denote missing material in a closed surface of the stencil. Basically, an opening may be a hole in the stencil.

The term 'access code' may denote a password, a personal identification number (also alphanumeric), a smart key or, in general, a code for an authorization, such that an access can be granted to a device. A user may use the access code for being granted access to an electronic device or an electronic lock for any type of device, a secured area, building, and the like.

The term 'pointing device' or 'pointing rubber' may denote a stylus or pen being used to interact with a touch-sensitive screen. A stylus with a conducting rubber may be used together with capacitive touch-sensitive screens.

The inventive method for authenticating an access to a device may offer multiple advantages and technical effects.

The inventive method of using a stencil together with a device comprising a touch-sensitive screen may allow only the owner of the stencil to access the device. The inventive method may be performed by the user. Even if an unauthorized second user may observe the process of being granted access to an authorized user, the second user may not easily repeat the process without having access to the stencil. Also, brute force attacks for unlocking the device by accidental random signals may be discouraged.

The user may not have to remember anything because the user may be guided by the stencil what kind of code or acronym is required to access the device via the touch-sensitive screen. In certain embodiments, it may also not matter how, or under which angle, the stencil may be positioned on the touch-sensitive screen. The method may work together with capacitive and resistive touch screens. No additional other devices may be required to be near the touch-sensitive screen.

Moreover, the inventive method and the related system may be used for a plurality of different devices such as a smartphone, a PDA (personal digital assistant), a GPS (global positioning system), a machine control and access unit, a car, a bicycle, a boat, a camera, and so on. Additionally, the inventive method may be combined with other known access control techniques for accessing a device using a touch screen.

The service itself may be accessing the device; i.e., an authentication service for accessing the device itself. In one embodiment, the inventive method allows for controlling an access to a specific application on the device (e.g., an application with enhanced security requirements such as a banking application) or for controlling a mobile access to a specific enterprise transactions system or sensitive data.

The inventive method may also represent an option to allow an identification in respect to a server using, e.g., a tablet computer. Assumed may be the following scenario. In a warehouse, a pile of tablet computers may be available to warehouse workers. Every worker may have the worker's personal stencil. The worker may grab a tablet computer and self identify the worker; e.g., with a user ID (identification) and password using the stencil as an authentication mechanism, which may allow for an enhanced flexibility in using devices accessible by a plurality of users.

According to one embodiment of the method, the stencil may be receivable from an issuing entity; i.e., from a third party, e.g., manufacturer, network provider and not from the user. This way, an initiation of the device (e.g., a mobile device such as a smartphone) may require the stencil. In one embodiment, the inventive method may be used for entering an initial PIN (personal identification number) for a new bank account or other trusted stakeholder. In this case, the bank or other trusted stakeholder may issue the stencil for a specific device and/or purpose.

According to another embodiment of the method, the at least one opening in the stencil may have been generated by a user; in particular by the owner or the user of the device or smartphone. In one embodiment, more than one opening may be generated in the stencil to allow for more complex codes to define an additional barrier for an unauthorized access to a device. Before using the stencil for access purposes, the system may undergo a training routine to learn the access code input using the stencil.

According to a further embodiment of the method, the stencil may comprise a plurality of openings 1 to 10, 3 to 5, etc. openings) wherein touches may be received by the touch-sensitive screen through the openings in a predefined sequence, and wherein the sequence may be at least part of the access code. However in one embodiment, not all openings may be used for touching the touch-sensitive screen. Also in one embodiment, non-usage of an opening may be part of the access code. In other cases, one or more openings may be used more than once to touch the touch-sensitive screen to determine the access code.

According to an embodiment of the method, the stencil may comprise a plurality of openings, wherein the touch-sensitive screen may be touched through more than one of the openings at a time through the openings in the stencil, which may increase the number of potential access codes. Thus, security may be increased even more.

According to another embodiment of the method, the at least one opening in the stencil may have a diameter large enough that a fingertip or pointing rubber may be able to reach a surface of the touch-sensitive screen though the at least opening, which may be advantageous because the touch-sensitive screen may be touched directly indicating an input without any other tools than the fingertip.

According to one embodiment of the method, the access code may be defined by a position option of a relative position of the openings to each other or, by positions of the openings relative to a geometry of the touch-sensitive screen. The method may allow for either or both position options. A potential intruder will not know the position option chosen by the user, which may enhance the security provided by the method. Actually, defining the code based on a relative positioning of the opening to each other releases the user from positioning the stencil always in the same way and direction. The user may also twist the stencil in respect to the touch-sensitive screen by any angle. Alternatively, it may be possible to turn the stencil 180°; i.e., use the backside of the stencil as the new front side. Access to the device may still be granted because in this case two alternative codes, respectively associated with the backside and the front side, may either or both be accepted as authorization codes by the device.

According to one embodiment of the method, the at least one opening in the stencil may be curve-shaped such that the code is represented by a form of the shape of the opening. Thus, the user may slide the user's fingertip along a slit-like curve in order to obtain access to the device. Additionally, a second or even more curved slits may be available defining the access code, for which the sequence of sliding along the slits, using a fingertip or stylus, may define the code as well as the direction of sliding along the slit.

According to an embodiment of the method, at least one side of the stencil may be covered with a foil; e.g., attached to the stencil at least around an outer area of the stencil. The foil may be designed to have no sticky area present in the region of the openings. The foil may be transparent or non-transparent, which may help to avoid finger prints on the screen by which the code may be determinable by non-trusted users or observers.

According to an embodiment of the method, the one or more openings of the stencil may be filled with an electrically conductive material in contrast to the normally electrically non-conductive stencil material. The electrically conductive material may be electrically conductive plastic or rubber. Additionally, there may not be any visual difference of the electrically conductive material if compared to the surface of the rest of electrically non-conductive stencil material. Thereby the openings become "virtual openings". Such a stencil may allow a similar usage. The electrically conductive material may be designed to simulate a touch indicating an input to the touch-sensitive screen just by becoming in touch with the touch-sensitive screen. Hence, in such case the stencil only needs to be placed on the surface of the touch-sensitive screen and be pressed slightly over the complete extension of the stencil, which may trigger an input to the touch-sensitive screen as if fingertips may have touched the touch-sensitive screen and unlocked the device. This mechanism may work with capacitive touch-sensitive screens.

The surface of the filled opening may have the same physical surface characteristic such as stiffness, thickness, roughness, etc. in order to not allow an intruder to identify the positions of the virtual openings by identifying the different material.

FIG. 1 shows a block diagram of an embodiment of a method 100 for authenticating an access to a service on a device, in accordance with embodiments of the present invention. The device may be a smartphone, a computer, a tablet computer, a convertible computer, a PDA, a GPS, a machine control and access unit, a camera, a car, a bicycle, a boat, or any other device needing access control. The device may comprise a touch-sensitive screen with capacitive, resistive or force-sensitive character. The method comprises providing, in step 102, a stencil; in particular, a stencil made from electrically non-conductive material comprising at least one opening. The at least one opening may have a form of a circle, an ellipse, a square, a heart shape, or any other shape at a predefined at least one location of the stencil. Each location represent a part of an access code. The stencil may, be flat, so that the stencil may fit to a flat touch-sensitive screen. The stencil may also have edges that surround edges of the device or the device's screen for a reproducible positioning of the stencil on the touch-sensitive screen.

The method 100 may further comprise positioning, in step 104, the stencil on the touch-sensitive screen and receiving touches, in step 106 (e.g., by a fingertip, by a stylus, a rubber touch element, a backend of a pen, or the like), indicating an input to the touch-sensitive screen at the at least one location through the at least one opening to enter the code. The received touches may require a certain predefined uncertainty or tolerance area around a center of the opening.

Moreover, the method 100 comprises determining, in step 108, that the entered code equals the part of the access code, and granting, in step 110, access to the service on a positive outcome of the determination. In one embodiment, the service may be the password service of the device, such that the access to the service may be equivalent to an access to the device itself.

Figure 2:
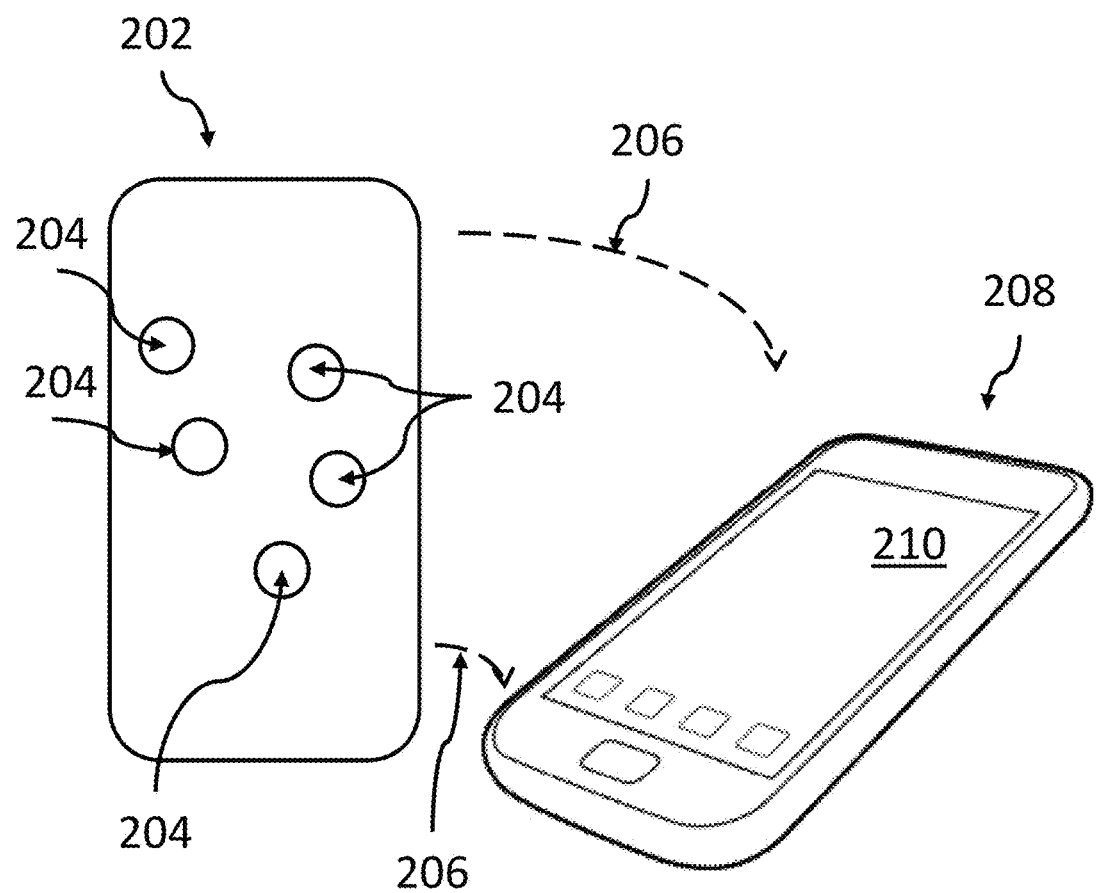
FIG. 2 shows a block diagram of an embodiment of a stencil to be used with a smart device, in accordance with embodiments of the present invention.

FIG. 2 shows a block diagram of an embodiment of a stencil 202 to be used with a smart device 208, in accordance with embodiments of the present invention. As an example for the device 208, a smartphone is used. The stencil 202 may comprise a plurality of openings 204 at different locations of the stencil 202. The positions of the openings 204 define the access code for accessing functions of the smart phone 208. If the stencil 202 is laid down on the touch-sensitive screen 210 of the smart phone 208, a user may touch or activate an area of the touch-sensitive screen 210 through the openings 204 in the stencil 202. The user may use the user's fingertips or a stylus. The touch-sensitive screen 210 may be of capacitive or resistive nature. The way the stencil 202 is laid on the smart phone 208 is indicated by the dashed arrows 206. It may be understood, that a user may touch the touch-sensitive screen 210 with more than one fingertip through more than one of the openings 204 simultaneously and/or in a predefined sequence. Also repetitions of touching through one of the openings 204 may be possible. The openings 200 need not be aligned with any displayed keyboard on the touch-sensitive screen 210. Actually, no symbols may need to be shown on the touch-sensitive screen when the access code is entered via the stencil 202.

It may be possible to define the access code via an absolute positioning of the openings 200 on the touch-sensitive screen 210 relative to edges of the touch-sensitive screen 210. In an embodiment, the relative position of the openings 204 on the touch-sensitive screen 210 may be selected as being only relevant to unlock the smart phone 208. In such a case, it does not matter under which angle the stencil 202 is positioned on the smart phone 208 relative to a rotational axis which may be normal to the surface of the smart phone 208 and the stencil 202. In one embodiment, openings in the stencil 202 may overlap at least partially.

Figure 3:
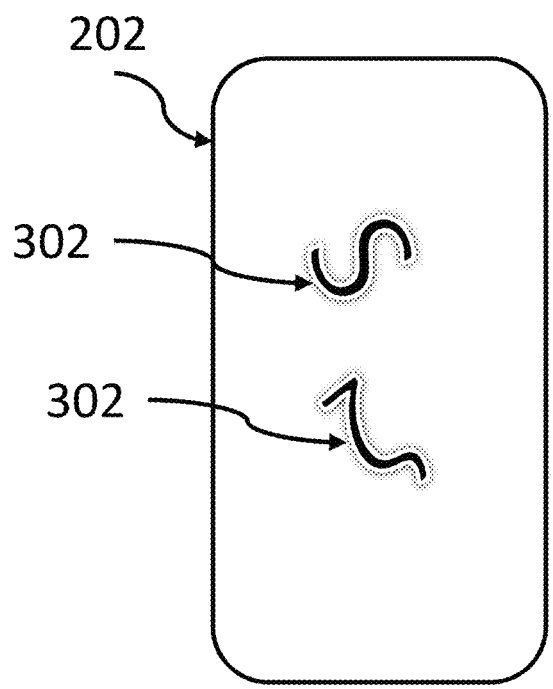
FIG. 3 shows a block diagram of another embodiment of the stencil, in accordance with embodiments of the present invention.

FIG. 3 shows a block diagram of another embodiment of the stencil 202, in accordance with embodiments of the present invention. Here, one or more patterns 302 are modeled into the surface of the flat stencil 202. A user may slide along the pattern 302 and the stencil in order to unlock the device. Multiple differently shaped patterns 302 may be possible. Thereby, it may be a part of the access code from which end of the patterned slit a user may start to touch the touch sensitive-screen 210. Also multiple activations of the touch-sensitive screen 210 through one or more of the openings/patterns 302 may define the access code. Additionally, also any combination of openings 204 and pattern 302 may be possible.

Figure 4:
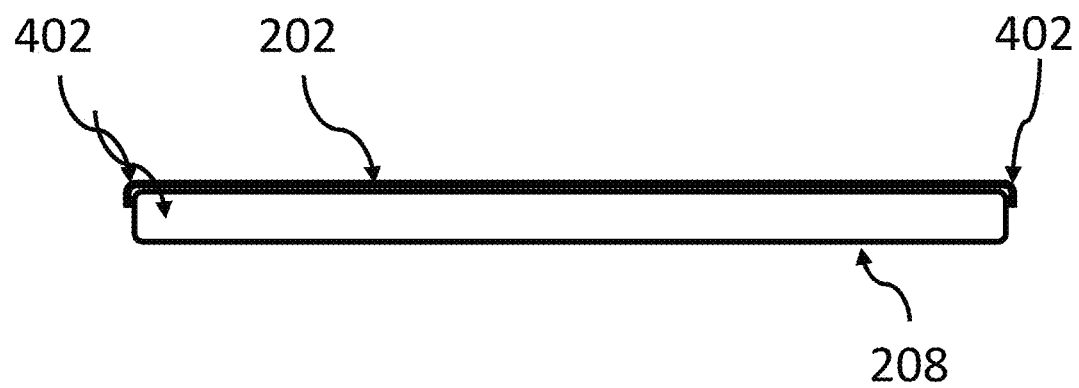
FIG. 4 shows an embodiment of edges of the stencil together with a smart device, in accordance with embodiments of the present invention

FIG. 4 shows an embodiment of edges 402 of the stencil 202 together with a smart device 208, in accordance with embodiments of the present invention. Here, edges 402 are shown on two ends(i.e., left and right ends) of the stencil 202, which may assist the user to removably fixate the stencil 202 in a predefined position on the touch-sensitive screen 210 of the device 208, using the edges 402 as fixing edges that fixate the stencil 202 on the touch-sensitive screen 210 of the device 208. Also, less or more than two fixing edges of the stencil 202 is within the scope of the present invention.

The stencil 202 may be designed to reach around a curved display, thus allowing the user to position one or more openings on the round edges of the display.

Figure 5:
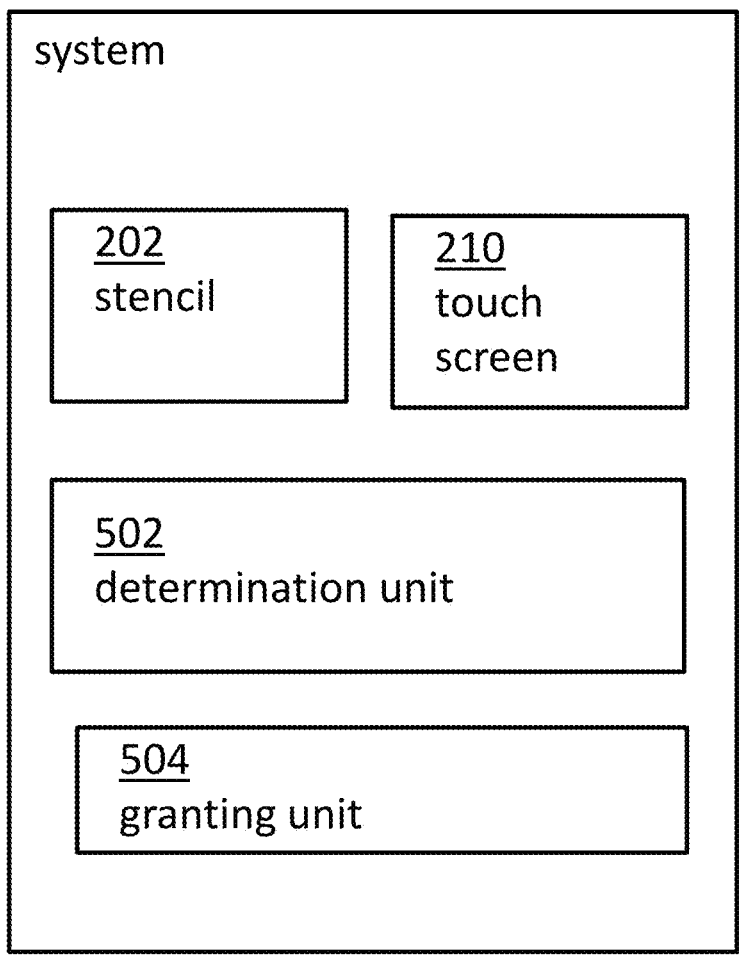
FIG. 5 shows a block diagram of a system for authenticating an access to a service on a device, in accordance with embodiments of the present invention.

FIG. 5 shows a block diagram of a system 500 for authenticating an access to a service on a device, in accordance with embodiments of the present invention. The system 500 comprises a touch-sensitive screen 210 and a stencil 202 comprising at least one opening 204, 302 at predefined locations. The locations and/or shapes of the openings represent a part of an access code. The stencil 202 is positioned on the touch-sensitive screen 210, and the touch-sensitive screen 210 receives a touch indicating an input at the at least one location through the at least one opening. The system comprises additionally a determination unit 502 for making a determination of whether the entered code equals the part of the access code and a granting unit 504 configured to grant access to the device in response to a positive outcome of the determination (i.e., an outcome of the entered code being equal to the part of the access code). In one embodiment, the determination unit 502 and the granting unit 504 are within the device 208.

Figure 6:
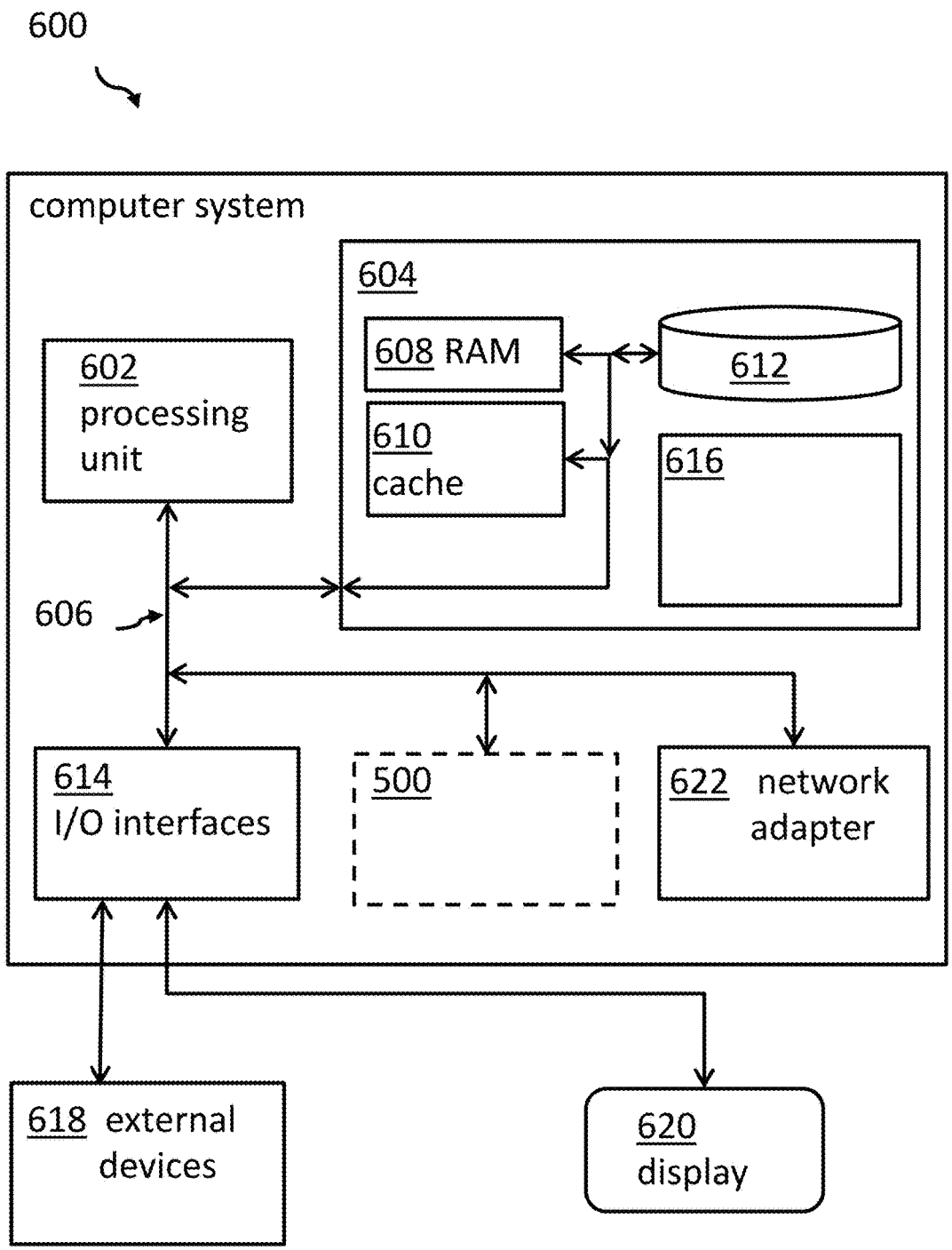
FIG. 6 shows an embodiment of a computer system for authenticating an access to a device, in accordance with embodiments of the present invention.

FIG. 6 shows an embodiment of a computer system 600 for authenticating an access to a device, in accordance with embodiments of the present invention.

Embodiments of the invention may be implemented together with virtually any type of computer, regardless of the platform being suitable for storing and/or executing program code. FIG. 6 shows, as an example, a computer system 600 suitable for executing program code to implement methods of the present invention. In one embodiment, the computer system 600 is a hardware server.

The computer system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computer system environments or configurations. Examples of well-known computer systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at east one) of program modules 616, may be stored in memory 604 (i.e., in storage device 612, cache 610, RAM 608, etc.) by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, hut are not limited to: microcode, device drivers, redundant processing units, external disk drive arrays, RAID systems, tape drives, and data archival storage systems, etc.

Additionally, the system 500 of FIG. 5 for authenticating an access to a device 208 or parts thereof may be attached to the bus system 606.

In one embodiment, the computer system 600, or components of the computer system 208 (e.g., the one or more processors 602, the system memory of 604, etc.), is within the device 208.

In one embodiment, the computer system 600 is exterior to the device 208, in which case the device 208 is communicatively coupled (e.g., via a communication network such as, for example, the Internet, an intranet, etc.) to the computer system 600 to communicate at least the user's touches of the touch-screen to the computer system 600, so that execution of program code by one or more processors of the computer system can implement methods of the present invention.

Regardless of whether the computer system 600 is exterior to the device 208, the device 208 comprises at least one processor, at least one storage device or medium, and at least one memory.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for authenticating an access to a service on a device, said method comprising:

after a stencil has been positioned on a touch-sensitive screen of the device:

receiving, by one or more processors, one or more touches of the touch-sensitive screen at each position of a plurality of positions of the touch-sensitive screen, said received one or more touches identifying a code entered by a user via the stencil, said stencil comprising a plurality of openings at respective locations of a plurality of predefined locations in the stencil, said plurality of predefined locations in the stencil positioned on the touch-sensitive screen defining an access code for authenticating the access to the service on the device, said plurality of openings being located at respective positions of the plurality of positions of the touch-sensitive screen, wherein the access code is defined by a relative position of the openings to each other, wherein the access code is independent of the respective positions of the touch-sensitive screen at which the openings are located, and wherein the access code is independent of an angle of rotation of the stencil with respect to a rotational axis normal to the touch-sensitive screen; and determining, by the one or more processors, that the entered code equals the access code, and in response, granting, by the one or more processors, the access to the service on the device.

2. The method of claim 1, wherein said receiving one or more touches comprises receiving one or more touches of the touch-sensitive screen through the opening at each predefined location in the stencil.

3. The method of claim 2, wherein said receiving one or more touches comprises receiving respective touches simultaneously through at least two openings of the plurality of openings in the stencil.

4. The method of claim 2, wherein said receiving one or more touches comprises receiving more than one touch through one opening of the plurality of openings in the stencil.

5. The method of claim 1, wherein the access code for authenticating the access to the service on the device is one access code or another access code alternatively if a front side of the stencil or a back side of the stencil, respectively, has been positioned on the touch-sensitive screen in direct physical contact with the touch-sensitive screen.

6. The method of claim 1, wherein the stencil made from an electrically non-conductive material, wherein each opening of the plurality of openings in the stencil is a virtual opening that is filled with an electrically conductive material, wherein the touch-sensitive screen is a capacitive positioned on a touch-sensitive screen, wherein said receiving one or more touches comprises receiving a touch of the touch-sensitive screen by the electrically conductive material at each virtual opening in the stencil while the stencil is being pressed on the touch-sensitive screen by the user.

7. A computer system, comprising one or more processors, one or more memories, and one or more computer readable hardware storage devices, said one or more hardware storage device containing program code executable by the one or more processors via the one or more memories to implement a method for authenticating an access to a service on a device, said method comprising:

after a stencil has been positioned on a touch-sensitive screen of the device:

receiving, by the one or more processors, one or more touches of the touch-sensitive screen at each position of a plurality of positions of the touch-sensitive screen, said received one or more touches identifying a code entered by a user via the stencil, said stencil comprising a plurality of openings at respective locations of a plurality of predefined locations in the stencil, said plurality of predefined locations in the stencil positioned on the touch-sensitive screen defining an access code for authenticating the access to the service on the device, said plurality of openings being located at respective positions of the plurality of positions of the touch-sensitive screen, wherein the access code is defined by a relative position of the openings to each other, wherein the access code is independent of the respective positions of the touch-sensitive screen at which the openings are located, and wherein the access code is independent of an angle of rotation of the stencil with respect to a rotational axis normal to the touch-sensitive screen; and determining, by the one or more processors, that the entered code equals the access code, and in response, granting, by the one or more processors, the access to the service on the device.

8. The computer system of claim 7, wherein said receiving one or more touches comprises receiving one or more touches of the touch-sensitive screen through the opening at each predefined location in the stencil.

9. The computer system of claim 8, wherein said receiving one or more touches comprises receiving respective touches simultaneously through at least two openings of the plurality of openings in the stencil.

10. The computer system of claim 8, wherein said receiving one or more touches comprises receiving more than one touch through one opening of the plurality of openings in the stencil.

11. A computer program product, comprising a computer readable storage medium having computer readable program code stored therein, said program code executable by one or more processors of a computer system to implement a method for authenticating an access to a service on a device, said method comprising:

after a stencil has been positioned on a touch-sensitive screen of the device:

receiving, by the one or more processors, one or more touches of the touch-sensitive screen at each position of a plurality of positions of the touch-sensitive screen, said received one or more touches identifying a code entered by a user via the stencil, said stencil comprising a plurality of openings at respective locations of a plurality of predefined locations in the stencil, said plurality of predefined locations in the stencil positioned on the touch-sensitive screen defining an access code for authenticating the access to the service on the device, said plurality of openings being located at respective positions of the plurality of positions of the touch-sensitive screen, wherein the access code is defined by a relative position of the openings to each other, wherein the access code is independent of the respective positions of the touch-sensitive screen at which the openings are located, and wherein the access code is independent of an angle of rotation of the stencil with respect to a rotational axis normal to the touch-sensitive screen; and determining, by the one or more processors, that the entered code equals the access code, and in response, granting, by the one or more processors, the access to the service on the device.

12. The computer program product of claim 11, wherein said receiving one or more touches comprises receiving one or more touches of the touch-sensitive screen through the opening at each predefined location in the stencil.

13. The computer program product of claim 12, wherein said receiving one or more touches comprises receiving respective touches simultaneously through at least two openings of the plurality of openings in the stencil.

14. The computer program product of claim 12, wherein said receiving one or more touches comprises receiving more than one touch through one opening of the plurality of openings in the stencil.

15. The method of claim 6, wherein there is no visual difference between the electrically conductive material and the electrically non-conductive material.

16. The method of claim 6, wherein the electrically conductive material and the electrically non-conductive material have same surface characteristics of stiffness and roughness.

* * * * *